United States Patent
Chen et al.

(10) Patent No.: US 8,848,729 B2
(45) Date of Patent: Sep. 30, 2014

(54) ALLOCATION METHOD FOR PHYSICAL DOWNLINK CONTROL CHANNEL, BASE STATION AND USER TERMINAL

(75) Inventors: Li Chen, Beijing (CN); Zhuo Gao, Beijing (CN); Guooing Li, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 461 days.

(21) Appl. No.: 13/145,746

(22) PCT Filed: Jan. 14, 2010

(86) PCT No.: PCT/CN2010/070179
§ 371 (c)(1),
(2), (4) Date: May 18, 2012

(87) PCT Pub. No.: WO2010/083741
PCT Pub. Date: Jul. 29, 2010

(65) Prior Publication Data
US 2012/0188886 A1    Jul. 26, 2012

(30) Foreign Application Priority Data
Jan. 21, 2009    (CN) .......................... 2009 1 0077297

(51) Int. Cl.
*H04J 3/16* (2006.01)
*H04L 5/00* (2006.01)
*H04W 52/02* (2009.01)
*H04W 24/00* (2009.01)
*H04W 68/00* (2009.01)
*H04W 72/04* (2009.01)

(52) U.S. Cl.
CPC ............ *H04W 72/042* (2013.01); *H04W 24/00* (2013.01); *H04W 68/00* (2013.01); *H04L 5/0096* (2013.01); *Y02B 60/50* (2013.01); *H04L 5/0098* (2013.01); *H04L 5/001* (2013.01); *H04W 52/0229* (2013.01); *H04W 72/0453* (2013.01)
USPC .......................... 370/437; 370/329; 370/343

(58) Field of Classification Search
CPC ............................ H04W 72/042; H04L 5/003
USPC ................... 370/329, 343, 437, 252; 455/450
See application file for complete search history.

(56) References Cited

U.S. PATENT DOCUMENTS 8,054,788 B2 * 11/2011 Ma et al. ....................... 370/329

* cited by examiner

*Primary Examiner* — Chandrahas Patel
(74) *Attorney, Agent, or Firm* — LaRiviere, Grubman & Payne, LLP

(57) ABSTRACT

The present invention discloses a method for configuring a Physical Downlink Control Channel (PDCCH), a base station and a UE, wherein the base station configures a component carrier or component carriers for monitoring the PDCCH for the UE and notifies the UE about information on the configured component carrier or component carriers so that the UE monitors the PDCCH only over the configured component carrier or component carriers. Stated otherwise, in this way, the UE will operate only over a necessary component carrier or component carriers without monitoring respective component carriers in an LTE-A system to thereby reduce the number of concurrently monitored component carriers, and in the case of nonconsecutive component carriers, also reduce the number of consequently enabled receivers and consequently the amount of consumed power of the UE for monitoring the PDCCH.

16 Claims, 7 Drawing Sheets

ALLOCATION METHOD FOR PHYSICAL DOWNLINK CONTROL CHANNEL, BASE STATION AND USER TERMINAL

FIELD OF THE INVENTION

The present invention relates to the field of mobile communications and in particular to a method for configuring a downlink physical control channel, a base station and user equipment (UE).

BACKGROUND OF THE INVENTION

In the Long Term Evolution (LTE) system or earlier wireless communication systems, a cell may correspond to only one carrier typically with a maximum bandwidth of 20 MHz. In the subsequently proposed Long Term Evolution-Advanced (LTE-A) system, the peak rate of the system has been greatly improved over the LTE system up to 1 Gbps in the downlink and 500 Mbps in the uplink. This requirement can not be satisfied over a carrier with a bandwidth of 20 MHz, and therefore Carrier Aggregation (CA) has been introduced to the LTE-A system so that a plurality of consecutive or inconsecutive carriers in a cell are aggregated together to serve a UE concurrently, where the aggregated carriers are commonly referred to as component carriers, each of which generally has a bandwidth of no more than 20 MHz. As illustrated in FIG. 1, a plurality of (four in the figure) component carriers can be aggregated in an LTE-A cell, and a base station and a UE can transmit data over the aggregated component carriers for an improved throughout of the system.

Scheduling information on resource allocated to UEs is carried over a Physical Downlink Control Channel (PDCCH), and the respective UEs monitor the PDCCH allocated thereto and acquire the resource scheduling information so that they can transmit data only over time and frequency resources indicated by the resource scheduling information. No method for configuring a PDCCH has been proposed so far for the LTE-A system, and if the use of the method for the LTE system were continued, then a UE would have to monitor respective component carriers of the LTE-A system and acquire resource scheduling information over a detected PDCCH, which may mean that the UE has to operate over the respective component carriers and consequently will waste its consumed power.

SUMMARY OF THE INVENTION

In view of this, the invention provides a method for configuring a PDCCH, a base station and a UE to reduce the amount of consumed power of the UE for monitoring the PDCCH.

A method for configuring a PDCCH includes:
configuring by a base station a component carrier or component carriers for a UE for monitoring the PDCCH and notifying the UE about information on the configured component carrier or component carriers so that the UE monitors the PDCCH only over the configured component carrier or component carriers.

A base station includes a carrier configuration unit and an information notification unit, wherein:
the carrier configuration unit is configured to configure a component carrier or component carriers for a UE for monitoring a PDDCH; and
the information notification unit is configured to notify the UE about information on the component carrier or component carriers configured by the carrier configuration unit so that the UE monitors the PDCCH only over the configured component carrier or component carriers.

A UE includes an information reception unit and a carrier monitoring unit, wherein:
the information reception unit is configured to receive information on a component carrier or component carriers configured by a base station for the UE to monitor a PDCCH; and
the carrier monitoring unit is configured to monitor the PDCCH only over the component carrier or component carriers configured for the UE according to the information on the component carrier or component carriers received by the information reception unit.

As can be apparent from the foregoing technical solutions, the invention provides a method for configuring a PDCCH in an LTE-A system, particularly by configuring for a UE a component carrier or component carriers for monitoring the PDCCH and by notifying the UE about information on the configured component carrier or component carriers so that the UE monitors the PDCCH only over the configured component carrier or component carriers. That is to say, in this way, the UE will operate only over a necessary component carrier or component carriers without monitoring respective component carriers in the LTE-A system to thereby reduce the number of concurrently monitored component carriers, and in the case of nonconsecutive component carriers, also reduce the number of consequently enabled receivers and consequently the amount of consumed power of the UE for monitoring the PDCCH.

DETAILED DESCRIPTION OF THE INVENTION

In order to make the objects, aspects and advantages of the invention more apparent, the invention will be described in details hereinafter with reference to the drawings and embodiments thereof.

A method according to the invention generally includes: a base station configures a UE with a component carrier for monitoring a PDCCH and notifies the UE about information on the configured component carrier so that the UE monitors a PDCCH over the configured component carrier.

The foregoing method will be described in details below in several embodiments.

Figure 1:
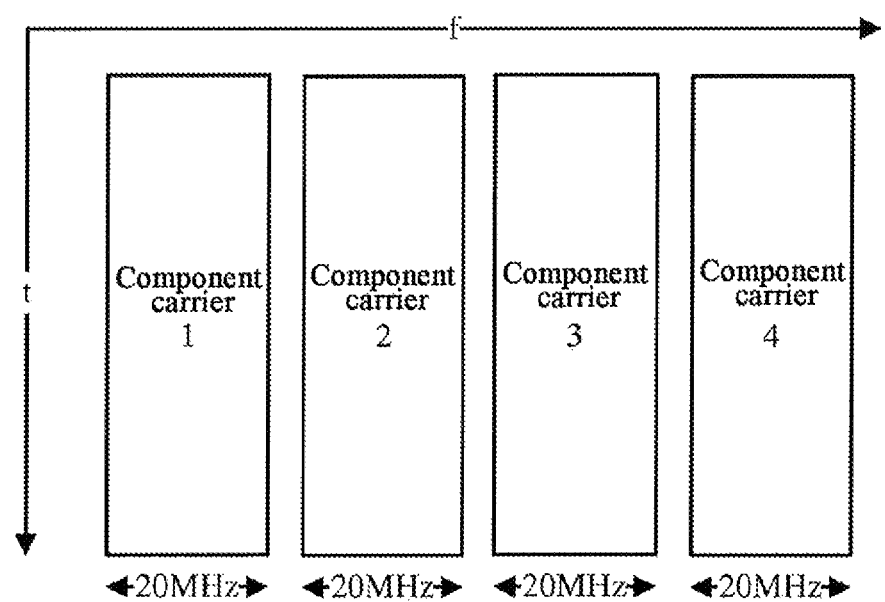
FIG. 1 is a schematic diagram of aggregated carriers in an LTE-A system.
Figure 2A:
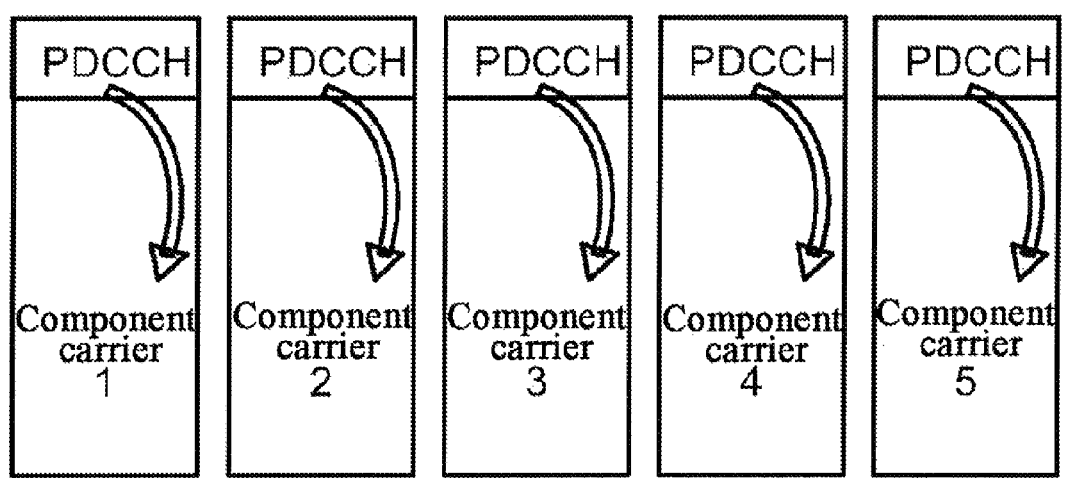
FIG. 2a is a schematic diagram of a PDCCH scheduling relationship according to the first embodiment of the invention.

In a first embodiment, a PDCCH is configured over different component carriers, and only the data transmission over the component carrier where the PDCCH resides is scheduled for the PDCCH over the respective component carriers, that is, only the downlink data transmission over the component carrier where the PDCCH resides and data transmission over the uplink component carrier corresponding thereto is scheduled, as illustrated in FIG. 2a.

Figure 2B:
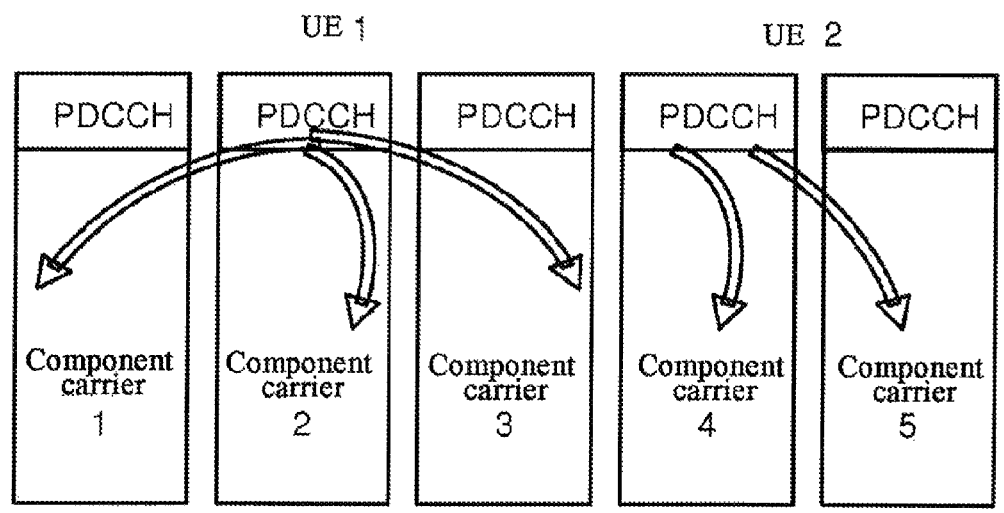
FIG. 2b is a schematic diagram of a PDCCH scheduling relationship according to the second embodiment of the invention.
Figure 3:
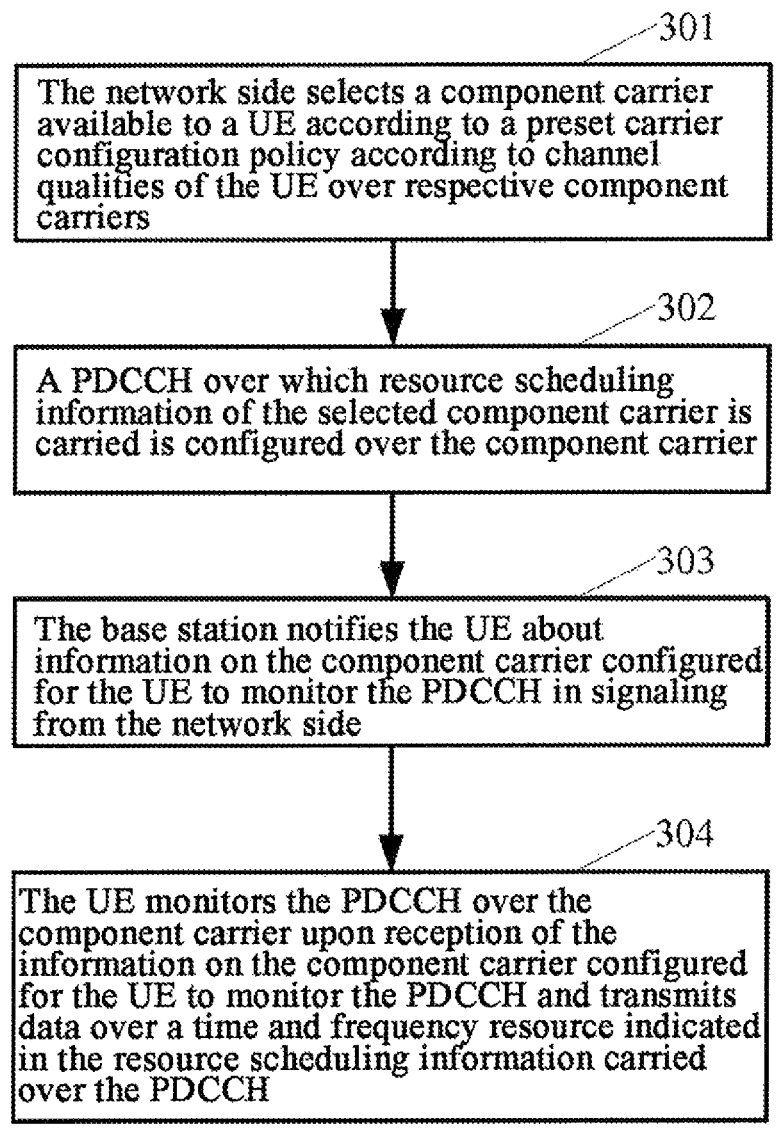
FIG. 3 is a flow chart of a method according to the first embodiment of the invention.

FIG. 3 is a flow chart of a method according to the first embodiment, as illustrated in FIG. 2, which can include the following steps:

Step 301: A base station selects a component carrier available to a UE based on a preset carrier configuration policy according to channel qualities of the UE over respective component carriers.

In this step, the network side can acquire the channel qualities of the UE over the respective component carriers from random access (preamble) codes transmitted from the UE, where the network side can directly measure, with the preamble code transmitted from the UE, the quality of a downlink component carrier corresponding to an uplink component carrier over which the preamble code is transmitted or determine the channel qualities of the UE over the respective component carriers from path loss information over the respective component carriers implicitly carried in the preamble codes. For example, the preamble codes can be grouped in advance so that each of the groups can represent a path loss condition. For example, the preamble codes can be grouped in advance into groups A and B, and, if the UE measures a downlink path loss above a preset threshold, then the preamble code of the group A is transmitted, and the network side determines that the path loss of the UE over the component carrier is above the preset threshold upon reception of the preamble code of the group A.

Particularly a component carrier available to the UE can be selected according to the preset carrier configuration policy by selecting a component carrier with a channel quality above a preset quality threshold for the UE according to the channel qualities of the UE over the respective component carriers.

In addition to selecting a component carrier for the UE according to the channel qualities of the UE over the respective component carriers, a component carrier can be selected for the UE according to one or any combination of the following factors: a transmission capability of the UE, a service characteristic of the UE, loads of the UE over the respective component carriers, etc. A corresponding carrier configuration policy may be that a component carrier with a bandwidth or a transmission quality satisfying an access requirement is selected for the UE according to the service characteristic of the UE, for example, if the service characteristic of the UE relates to a high rate or a large bandwidth required for an access service, then a member with a large bandwidth or a good transmission quality is selected for the UE; or that a component carrier with a bandwidth or a transmission quality satisfying the transmission capability of the UE is selected for the UE according to the transmission capability of the UE, for example, if the UE has a strong transmission capability, then a component carrier with a large bandwidth or a good channel quality is selected for the UE, and if the UE is a newly accessing UE, then a component carrier with a load condition below a preset load threshold is selected for the UE.

It shall be noted that a plurality of component carriers can be selected for the UE dependent upon a specific requirement instead of selecting one component carrier for the UE.

Step 302: A PDCCH over which resource scheduling information of the selected component carrier is carried is configured over the selected component carrier.

In this embodiment, only the data transmission over the component carrier where the PDCCH resides is scheduled for the PDCCH over the respective component carriers, and therefore resource scheduling information of the component carrier is carried over the PDCCH configured over the component carrier after the component carrier is selected.

Step 303: The base station notifies the UE about information on the component carrier or component carriers configured for the UE to monitor the PDCCH by the way of signaling from the network side.

In this step, the base station notify the UE about information on the component carrier configured for the UE to monitor the PDCCH in Radio Resource Control (RRC) signaling, a Media Access Control (MAC) command or a PDCCH control command so that the UE only monitors the PDCCH over the component carrier.

Furthermore it can alternatively notify the UE in a system broadcast from a system instead of notifying the UE in signaling from the network side. The network side can group component carriers allocated to respective UEs into respective sets of component carriers and notify in a system broadcast the UE about information on grouping of the component carriers and the identifier of a set of component carriers where the UE resides; or the network side and the UE can prescribe grouping of the respective component carriers into the sets of component carriers, and the network side can simply notify in a system broadcast the UE about the identifier of a set of component carriers where the UE resides.

Step 304: The UE monitors the PDCCH over the component carrier upon reception of the information on the component carrier configured for the UE to monitor the PDCCH and transmits data over a time and frequency resource indicated in the resource scheduling information carried over the PDCCH.

The UE will monitor only the component carrier upon reception of the information on the component carrier configured for the UE to monitor the PDCCH and transmit data only over the downlink component carrier where the PDCCH resides and an uplink component carrier corresponding thereto, that is, transmit data over a time and frequency resource indicated in the resource scheduling information carried over the PDCCH.

In a second embodiment, for a set of component carriers configured for a UE, data transmission over any of component carriers in the set of component carriers where a PDCCH resides can be scheduled for the PDCCH over the respective component carriers. As illustrated in FIG. 2b, a UE 1 is configured with a set of component carriers consisted of a component carrier 1, a component carrier 2 and a component carrier 3, and data transmission over the component carrier 1, the component carrier 2 and the component carrier 3 can be scheduled for any PDCCH in the set of component carriers.

Figure 4:
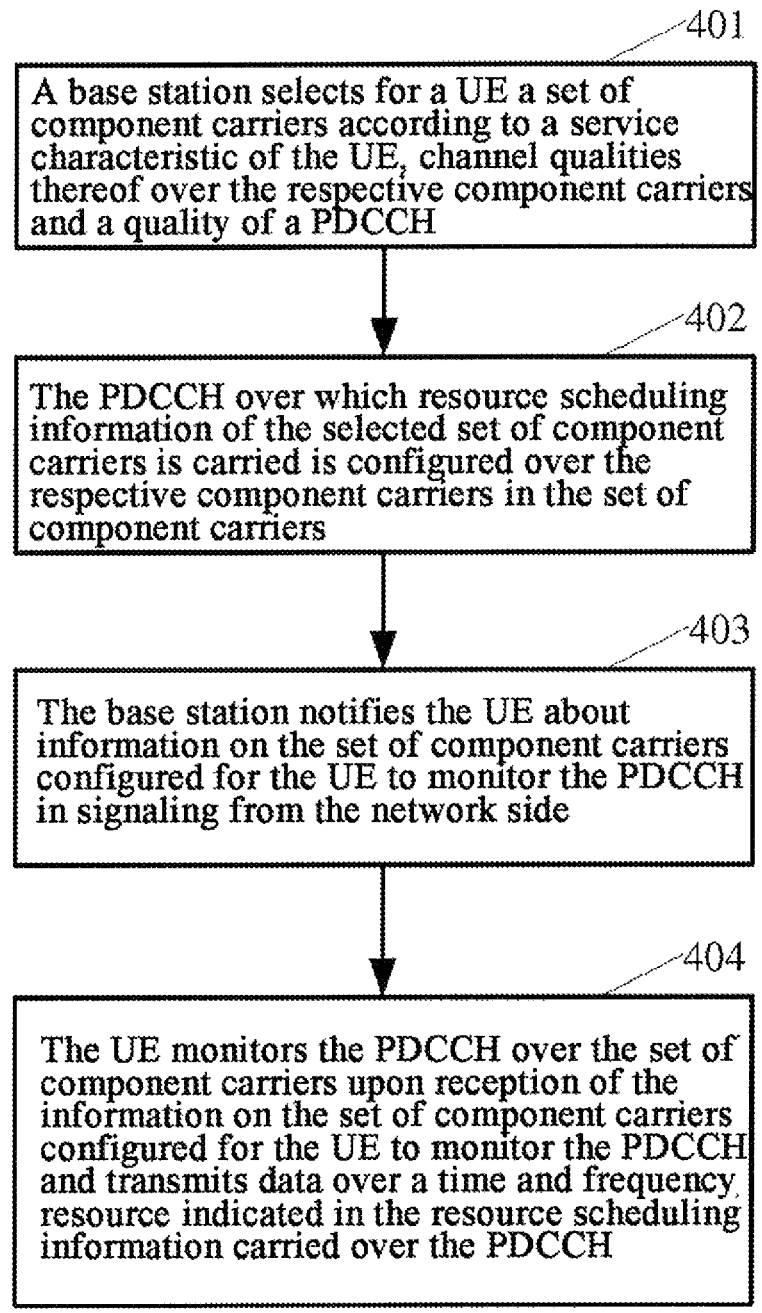
FIG. 4 is a flow chart of a method according to the second embodiment of the invention.

FIG. 4 is a flow chart of a method according to a second embodiment of the invention, as illustrated in FIG. 4, which can include the following steps:

Step 401: A base station selects the available component carriers for a UE according to a service characteristic of the UE, channel qualities thereof over the respective component carriers and a quality of a PDCCH so as to constitute a set of component carriers.

In this step, a set of component carriers can be selected particularly in the following steps:

S1: The base station, firstly determines the amount of resource required for the UE according to the service characteristic of the UE and the channel qualities thereof over the respective component carriers.

S2: A PDCCH bandwidth required for the UE is determined according to the amount of resource required for the UE and the quality of the PDCCH.

S3: The base station selects for the UE the set of component carriers satisfying the required PDCCH bandwidth. That is, the sum of PDCCH bandwidths of the component carriers in the set of component carriers is larger than or equal to the PDCCH bandwidth required for the UE. The set of component carriers typically contains more than one component carrier.

Step 402: The PDCCH over which resource scheduling information of the selected set of component carriers is carried is configured over the respective component carriers in the set of component carriers.

Since the respective component carriers in the set of component carriers can be scheduled for the PDCCH of any component carrier in the set of component carriers, the PDCCH configured over the respective component carriers in the set of component carriers is the resource scheduling information that carries the set of component carriers.

Step 403: The base station notifies the UE about information on the set of component carriers configured for the UE to monitor the PDCCH in signaling from the network side.

Likewise, the base station can notify the UE about information on the set of component carriers configured for the UE to monitor the PDCCH in RRC signaling, an MAC command or a PDCCH control command so that the UE only monitors the PDCCH over the set of component carriers.

Furthermore it can alternatively notify the UE in a system broadcast from a system instead of notifying the UE in signaling from the network side.

Step 404: The UE monitors the PDCCH over the set of component carriers upon reception of the information on the set of component carriers configured for the UE to monitor the PDCCH and transmits data over a time and frequency resource indicated in the resource scheduling information carried over the PDCCH.

The UE will monitor only the component carriers in the set of component carriers upon reception of the information on the set of component carriers configured for the UE to monitor the PDCCH and transmit data only over the downlink members carrier where the PDCCH resides and uplink component carriers corresponding thereto, that is, transmit data over a time and frequency resource indicated in the resource scheduling information carried over the PDCCH.

In the foregoing embodiments, the component carrier(s) can be configured for the UE to monitor the PDCCH as initial configuration or reconfiguration of the UE.

According to the above two embodiments, the component carrier(s) can be configured for the UE to monitor the PDCCH, and after the UE monitors the PDCCH over the component carrier(s) configured for the UE, the component carrier(s) configured for the UE may not satisfy the service requirement of the UE any longer as a channel condition, a service load, the amount of traffic of the UE, etc., varies, and at this time the base station can adjust the component carrier (s) configured for the UE.

Particularly, the base station can determine whether the component carrier(s) configured for the UE satisfies the service requirement of the UE in real time according to one or any combination of a channel quality of the component carrier(s) configured for the UE, a load of the component carrier (s) and the amount of traffic of the UE, and if not so, then the base station can trigger a flow of adjusting for the UE the component carrier(s) where the PDCCH resides, that is, adjusting the component carrier(s) configured for the UE to monitor the PDCCH to another component carrier satisfying the service requirement of the UE.

A situation resulting in adjusting the component carrier(s) may be that the component carrier(s) configured for the UE shall be adjusted after the UE establishes a connection with a network because the base station acquires insufficient information on the UE when the UE initially access the network; or the component carrier(s) configured for the UE will be adjusted due to a change to the channel quality of the component carrier(s) or adjusted to the component carrier(s) with a larger or smaller bandwidth due to a change to the amount of traffic of the UE during data transmission; or the component carrier(s) configured for the UE will be adjusted due to a change to the load of the component carrier(s), for example, there are so many UEs over a component carrier that the load of the component carrier reaches a load threshed, and a part of the UEs shall be adjusted to a lightly loaded component carrier; so on.

Figure 5:
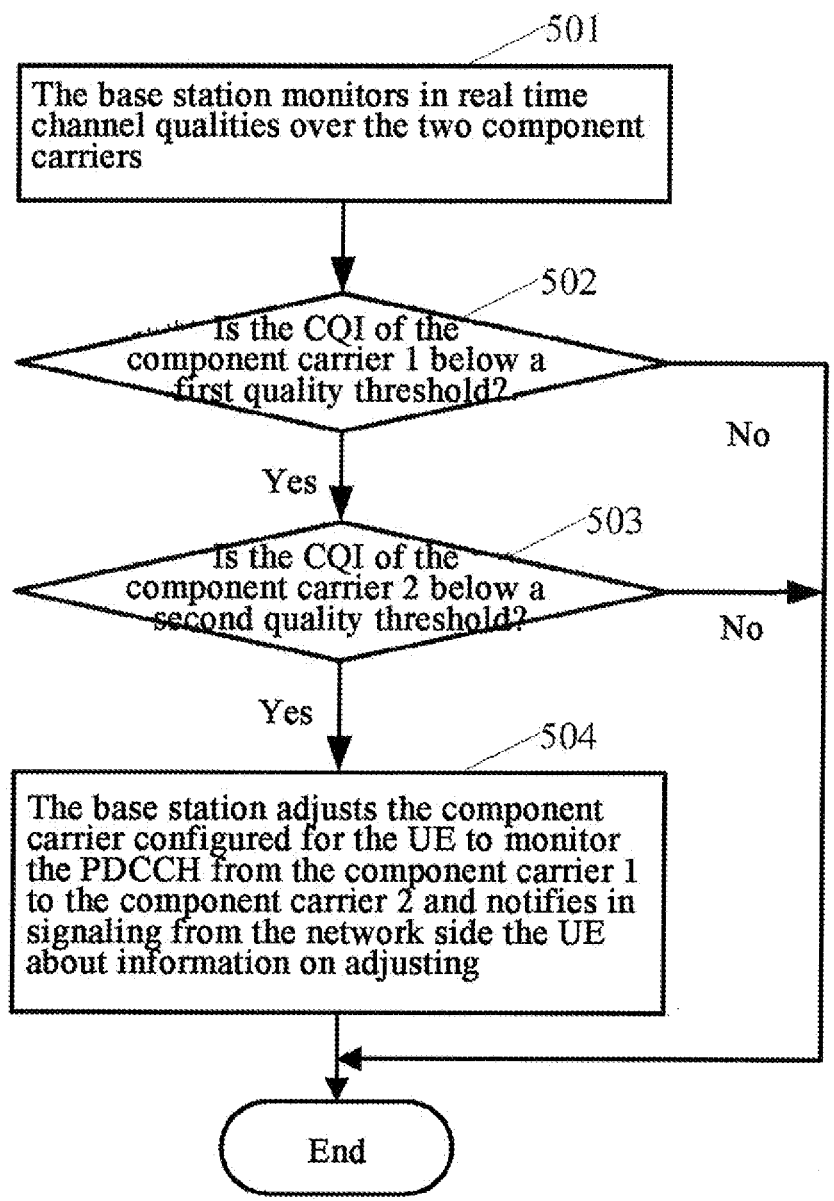
FIG. 5 is a flow chart of a method for adjusting a component carrier according to the embodiment of the invention.

A description will be presented below of an example in which a component carrier configured for the UE to monitor the PDCCH is adjusted to a varying channel quality, and as illustrated in FIG. 5, if a component carrier originally configured for the UE is a component carrier 1 and there is another component carrier 2 in the system, then the process can include the following steps:

Step 501: The base station monitors in real time channel qualities over the two component carriers.

The UE can measure channel qualities over the two component carriers and report measurement results to the base station in a Channel Quality Indicator (CQI), where a smaller CQI indicates a poorer channel quality.

Step 502: The base station determines whether the CQI of the component carrier 1 is below a first quality threshold, and if so, then the process goes to the step 503; otherwise, the flow ends.

Here two quality thresholds can be set, where the first quality threshold is smaller or equal to the second threshold. The CQI of the component carrier 1 smaller than the first quality threshold indicates that the channel quality of the component carrier 1 has been degraded and needed to be adjusted.

Step 503: The base station determines whether the CQI of the component carrier 2 is above the second quality threshold, and if so, then the process goes to the step 504; otherwise, the flow ends.

Step 504: The base station adjusts the component carrier configured for the UE to monitor the PDCCH from the component carrier 1 to the component carrier 2 and notifies the UE about information on adjusting in signaling from the network side.

Here the two component carriers are taken only as an example, and if there are more than two component carriers, then a component carrier with a CQI above the second quality threshold can be selected from the component carriers which have not been configured for the UE and the UE can be adjusted to the selected component carrier.

Figure 6:
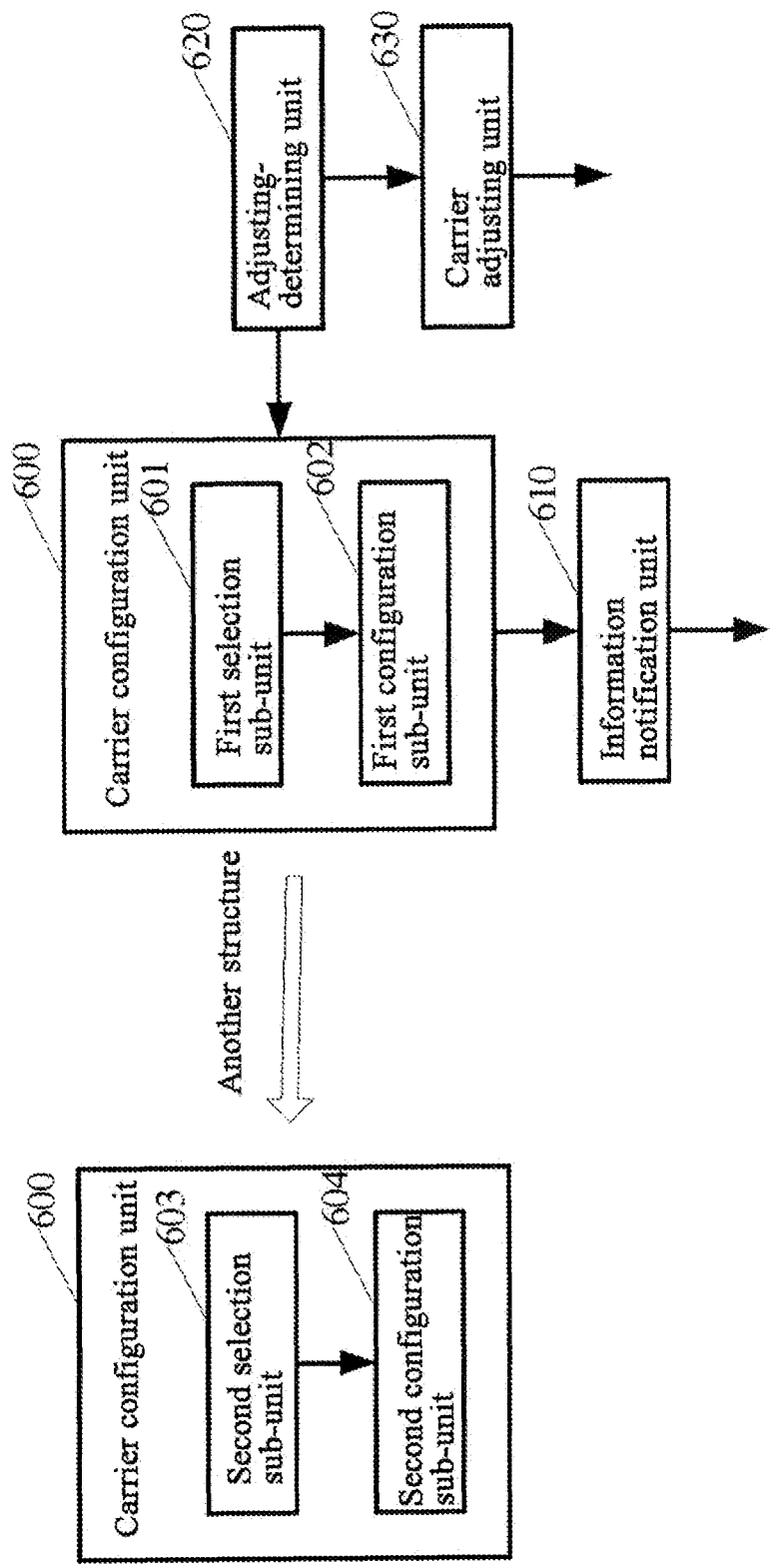
FIG. 6 is a structural diagram of a base station according to the embodiment of the invention.

The method according to the invention has been described in details above, and a base station and a UE according to the invention will be described in details below. FIG. 6 is a structural diagram of a base station according to an embodiment of the invention, as illustrated in FIG. 6, which includes a carrier configuration unit 600 and an information notification unit 610.

The carrier configuration unit 600 is configured to configure for a UE with a component carrier or component carriers for monitoring a PDDCH.

The information notification unit 610 is configured to notify the UE about information on the component carrier or component carriers configured by the carrier configuration unit 600 so that the UE only monitors the PDCCH over the configured component carrier or component carriers.

Particularly the carrier configuration unit 600 can include a first selection sub-unit 601 and a first configuration sub-unit 602.

The first selection sub-unit 601 is configured to select the component carrier available to the UE based on a preset carrier configuration policy according to one or any combination of channel qualities of the UE over respective component carriers, a service characteristic of the UE, a transmission capability of the UE and whether the UE is a newly accessing UE.

The first selection sub-unit 601 can select for the UE the component carrier with a channel quality above a preset quality threshold according to the channel qualities of the UE over the respective component carriers; or select for the UE the component carrier with a bandwidth or a transmission quality satisfying the requirement of an access service according to the service characteristic of the UE; or select for the UE the component carrier with a bandwidth or a transmission quality satisfying the transmission quality of the UE according to the transmission quality of the UE; or select for the UE the component carrier with a load condition below a preset load threshold if the UE is a newly accessing UE; or any combination thereof.

The first configuration sub-unit 602 is configured to configure the PDCCH over which resource scheduling information of the component carrier is carried over the component carrier selected by the first selection sub-unit 601.

Alternatively in another structure, the carrier configuration unit 600 can particularly include a second selection sub-unit 603 and a second configuration sub-unit 604.

The second selection sub-unit 603 is configured to select the available component carriers for the UE according to a service characteristic of the UE, channel qualities thereof over the respective component carriers and a quality of the PDCCH so as to constitute a set of component carriers.

In a specific selection operation, the amount of resource required for the UE can be determined according to the service characteristic of the UE and the channel qualities thereof over the respective component carriers; a PDCCH bandwidth required for the UE can be determined according to the amount of resource required for the UE and the quality of the PDCCH; and a set of component carriers constituted of component carriers satisfying the required PDCCH bandwidth can be selected for the UE.

The second configuration sub-unit 604 is configured to configure the PDCCH over which resource scheduling information of the component carriers is carried over the component carriers selected by the second selection sub-unit 603.

Furthermore the information notification unit 610 can notify the UE about the information on the configured component carrier or component carriers in signaling from the network side or a system broadcast.

Particularly, the signaling from the network side can include Radio Resource Control (RRC) signaling or Media Access Control (MAC) signaling or PDCCH control signaling, and the system broadcast can include information on grouping of the respective component carriers into sets of component carriers and the identifier of a set of component carriers or the identifiers of sets of component carriers where the component carrier or component carriers configured for the UE resides or reside; or the network side and the UE can prescribe the information on grouping of the respective component carriers into the sets of component carriers, and at this time the system broadcast can include the identifier of a set of component carriers or the identifiers of sets of component carriers where the component carrier or component carriers configured for the UE resides or reside.

Preferably, the base station can further include an adjusting-determining unit 620 and a carrier adjusting unit 630.

The adjusting-determining unit 620 is configured to determine whether the component carrier or component carriers configured by the carrier configuration unit 600 for the UE to monitor the PDCCH satisfies or satisfy a service requirement of the UE, and if not, then transmit an adjusting instruction to the carrier adjusting unit 630.

The carrier adjusting unit 620 can perform the foregoing operation of determining particularly according to one or any combination of a channel, quality and a load condition of the component carrier or component carriers configured for the UE to monitor the PDCCH or the amount of traffic of the UE.

The carrier adjusting unit 630 is configured to adjust the component carrier or component carriers configured for the UE to monitor the PDCCH to another component carrier or other component carriers satisfying the service requirement of the UE upon reception of the adjusting instruction and to notify the UE about information on adjusting in signaling from the network side.

A UE according to the invention can include an information reception unit and a carrier monitoring unit.

The information reception unit is configured to receive information on a component carrier or component carriers configured by a base station for the UE to monitor a PDCCH.

The carrier monitoring unit is configured to monitor the PDCCH only over the component carrier or component carriers configured for the UE according to the information on the component carrier or component carriers received by the information reception unit.

Particularly, the information reception unit can receive the information on the component carrier or component carriers configured by the base station for the UE to monitor the PDCCH in signaling from the network side or a system broadcast.

The information reception unit can further be configured to receive in signaling from the network side adjusting information including information on adjusting the component carrier or component carriers configured for the UE to monitor the PDCCH to another component carrier or other component carriers satisfying a service requirement of the UE.

The carrier monitoring unit can further be configured to adjust the monitoring of the PDCCH over the component carrier or component carriers configured for the UE to the monitoring of the PDCCH over the adjusted component carrier or component carriers according to the adjusting information received by the information reception unit.

It shall be noted that the method and device according to the invention will not be limited to the LTE-A system in the embodiments but can also be applicable to other wireless communication system with carrier aggregation.

As can be apparent from the foregoing description, the invention provides a method for configuring a PDCCH in an LTE-A system, particularly by configuring for a UE a component carrier or component carriers for monitoring the PDCCH and by notifying the UE about information on the configured component carrier or component carriers so that the UE monitors the PDCCH only over the configured component carrier or component carriers. Stated otherwise, in this way, the UE will operate only over a necessary component carrier or component carriers without monitoring respective component carriers in the LTE-A system to thereby reduce the number of concurrently monitored component carriers, and in the case of nonconsecutive component carriers, also reduce the number of consequently enabled receivers and consequently the amount of consumed power of the UE for monitoring the PDCCH.

The foregoing description is merely illustrative of the preferred embodiments of the invention but not to limit the invention, and any modifications, equivalent substitutions and adaptations made without departing from the spirit and principle of the invention shall come into the scope of the invention.

The invention claimed is:

1. A method for configuring a Physical Downlink Control Channel, PDCCH, characterized by comprising:
configuring, by a base station, a component carrier or component carriers for a UE for monitoring the PDCCH and notifying the UE about information on the configured component carrier or component carriers so that the UE monitors the PDCCH only over the configured component carrier or component carriers;
selecting by the base station, the available component carriers for UE according to a service characteristic of the UE, channel qualities thereof over the respective component carriers and a quality of the PDCCH so as to constitute a set of component carriers; and
configuring the PDCCH over which resource scheduling information of the set of component carrier is carried over the selected component carriers.

2. The method according to claim 1, characterized in that configuring, by the base station, the component carrier for the UE for monitoring the PDCCH comprises:
selecting, by the base station, the component carrier available to the UE according to a preset carrier configuration policy; and
configuring, over the selected component carrier, the PDCCH over which resource scheduling information of the component carrier is carried.

3. The method according to claim 2, characterized in that the preset carrier configuration policy comprises one or any combination of the following policies:
the component carrier with a channel quality above a preset quality threshold is selected for the UE according to channel qualities of the UE over respective component carriers; or
the component carrier with a bandwidth or a transmission quality satisfying the requirement of an access service is selected for the UE according to a service characteristic of the UE; or
the component carrier with a bandwidth or a transmission quality satisfying a transmission capability of the UE is selected for the UE according to the transmission capability of the UE; or
the component carrier with a load condition below a preset load threshold is selected for the UE if the UE is a newly accessing UE.

4. The method according to claim 1, characterized in that the step of selecting, by the base station, the available component carriers for UE further comprises:
determining, by the base station, the amount of resource required for the UE according to the service characteristic of the UE and the channel qualities thereof over the respective component carriers;
determining a PDCCH bandwidth required for the UE according to the amount of resource required for the UE and the quality of the PDCCH; and
selecting for the UE the set of component carriers satisfying the required PDCCH bandwidth so as to constitute a set of component carriers.

5. The method according to claim 1, characterized in that notifying the UE about the information on the configured component carrier or component carriers comprises: notifying, by the base station, the UE about the information on the configured component carrier or component carriers by the way of signaling from the network side or a system broadcast.

6. The method according to claim 5, characterized in that the signaling from the network side comprises Radio Resource Control, RRC, signaling or Media Access Control, MAC, signaling or PDCCH control signaling; and
the system broadcast comprises information on grouping of the respective component carriers into sets of component carriers and the identifier of a set of component carriers or the identifiers of sets of component carriers where the component carrier or component carriers configured for the UE resides or reside; or the network side and the UE prescribe the information on grouping of the respective component carriers into the sets of component carriers, and the system broadcast comprises the identifier of a set of component carriers or the identifiers of sets of component carriers where the component carrier or component carriers configured for the UE resides or reside.

7. The method according to claim 1, characterized by further comprising: determining, by the base station, whether the component carrier or component carriers configured for the UE to monitor the PDCCH satisfies or satisfy a service requirement of the UE, and if not, then adjusting the component carrier or component carriers configured for the UE to monitor the PDCCH to another component carrier or other component carriers satisfying the service requirement of the UE, and notifying the UE about information on adjusting by the way of signaling from the network side.

8. The method according to claim 7, characterized in that the base station performs the step of determining according to one or any combination of a channel quality of the component carrier or component carriers configured for the UE to monitor the PDCCH, a load condition thereof or the amount of traffic of the UE.

9. The method according to claim 8, characterized in that when the base station performs the step of determining according to a channel quality of the component carrier or component carriers configured for the UE to monitor the PDCCH, the steps of determining and adjusting comprise:
determining, by the base station, whether a channel quality of the component carrier or component carriers configured for the UE to monitor the PDCCH is below a first quality threshold, and if so, then selecting a component carrier or component carriers with a channel quality above a second quality threshold from component carriers which are not configured for the UE, and adjusting the component carrier or component carriers configured for the UE to monitor the PDCCH to the selected component carrier or component carriers;
wherein the first quality threshold is smaller than or equal to the second quality threshold.

10. A UE, characterized by comprising an information reception unit and a carrier monitoring unit, wherein:
the information reception unit is configured to receive information on a component carrier or component carriers configured by a base station for the UE to monitor a PDCCH; and
the carrier monitoring unit is configured to monitor the PDCCH only over the component carrier or component carriers configured for the UE according to the information on the component carrier or component carriers received by the information reception unit;
wherein, the base station selects the available component carriers for the UE according to a service characteristic of the UE, channel qualities thereof over the respective component carriers and a quality of the PDCCH so as to constitute a set of component carriers; and the PDCCH is configured over the selected component carriers.

11. The UE according to claim 10, characterized in that the information reception unit receives the information on the component carrier or component carriers configured by the base station for the UE to monitor the PDCCH by the way of signaling from the network side or a system broadcast.

12. The UE according to claim 10, characterized in that the information reception unit is further configured to receive by the way of signaling from the network side adjusting information including information on adjusting the component carrier or component carriers configured for the UE to monitor the PDCCH to another component carrier or other component carriers satisfying a service requirement of the UE; and the carrier monitoring unit is further configured to monitor the PDCCH over the adjusted component carrier or component carriers according to the adjusting information received by the information reception unit.

13. A base station, characterized by comprising a carrier configuration unit and an information notification unit, wherein:
   the carrier configuration unit is configured to configure a component carrier or component carriers for a UE for monitoring a PDDCH, wherein the carrier configuration unit comprises a second selection sub-unit and a second configuration sub-unit;
   the information notification unit is configured to notify the UE about information on the component carrier or component carriers configured by the carrier configuration unit so that the UE monitors the PDCCH only over the configured component carrier or component carriers;
   the second selection sub-unit is configured to select the available component carriers for the UE according to a service characteristic of the UE, channel qualities thereof over the respective component carriers and a quality of the PDCCH so as to constitute a set of component carriers; and
   the second configuration sub-unit is configured to configure the PDCCH over which resource scheduling information of the component carriers is carried over the component carriers selected by the second selection sub-unit.

14. The base station according to claim 13, characterized in that the information notification unit notifies the UE about the information on the configured component carrier or component carriers by the way of signaling from the network side or a system broadcast.

15. The base station according to claim 13, characterized by further comprising an adjusting-determining unit and a carrier adjusting unit, wherein:
   the adjusting-determining unit is configured to determine whether the component carrier or component carriers configured by the carrier configuration unit for the UE to monitor the PDCCH satisfies or satisfy a service requirement of the UE, and if not, then transmit an adjusting instruction to the carrier adjusting unit; and
   the carrier adjusting unit is configured to adjust the component carrier or component carriers configured for the UE to monitor the PDCCH to another component carrier or other component carriers satisfying the service requirement of the UE upon reception of the adjusting instruction and to notify the UE about information on adjusting by the way of signaling from the network side.

16. The base station according to claim 13, characterized in that the carrier configuration unit comprises a first selection sub-unit and a first configuration sub-unit,
   the first selection sub-unit is configured to select the component carrier available to the UE based on a preset carrier configuration policy according to one or any combination of channel qualities of the UE over respective component carriers, a service characteristic of the UE, a transmission capability of the UE and whether the UE is a newly accessing UE; and
   the first configuration sub-unit is configured to configure the PDCCH over which resource scheduling information of the component carrier is carried over the component carrier selected by the first selection sub-unit.

* * * * *

UNITED STATES PATENT AND TRADEMARK OFFICE
CERTIFICATE OF CORRECTION

| | | |
|---|---|---|
| PATENT NO. | : 8,848,729 B2 | Page 1 of 1 |
| APPLICATION NO. | : 13/145746 | |
| DATED | : September 30, 2014 | |
| INVENTOR(S) | : Li Chen et al. | |

It is certified that error appears in the above-identified patent and that said Letters Patent is hereby corrected as shown below:

In the title page of the patent:
Item (75) - Inventors:

Delete "Guooing Li" and replace with --Guoqing Li--.

Signed and Sealed this
Third Day of February, 2015

Michelle K. Lee
*Deputy Director of the United States Patent and Trademark Office*